United States Patent
Bai et al.

(10) Patent No.: US 10,844,601 B2
(45) Date of Patent: Nov. 24, 2020

(54) ARTICLE COMPRISING AN ADHESION PROMOTOR COATING

(71) Applicant: 3M INNOVATIVE PROPERTIES COMPANY, St. Paul, MN (US)

(72) Inventors: Feng Bai, Woodbury, MN (US); Rachael A. T. Gould, Forest Lake, MN (US); Mark T. Anderson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 772 days.

(21) Appl. No.: 15/161,025

(22) Filed: May 20, 2016

(65) Prior Publication Data

US 2016/0265230 A1  Sep. 15, 2016

Related U.S. Application Data

(63) Continuation of application No. 12/521,006, filed as application No. PCT/US2007/087753 on Dec. 17, 2007, now abandoned.

(60) Provisional application No. 60/878,023, filed on Dec. 29, 2006.

(51) Int. Cl.

| | |
|---|---|
| *E04D 1/26* | (2006.01) |
| *C04B 41/52* | (2006.01) |
| *C08F 255/02* | (2006.01) |
| *C09J 151/06* | (2006.01) |
| *C08L 51/06* | (2006.01) |
| *C08F 255/00* | (2006.01) |
| *C09D 151/06* | (2006.01) |
| *E04D 1/00* | (2006.01) |

(52) U.S. Cl.
CPC ............... *E04D 1/26* (2013.01); *C04B 41/52* (2013.01); *C08F 255/00* (2013.01); *C08F 255/02* (2013.01); *C08L 51/06* (2013.01); *C09D 151/06* (2013.01); *C09J 151/06* (2013.01); *C08L 2666/02* (2013.01); *C08L 2666/04* (2013.01); *E04D 2001/005* (2013.01); *Y10T 428/25* (2015.01); *Y10T 428/2998* (2015.01); *Y10T 428/31511* (2015.04); *Y10T 428/31551* (2015.04); *Y10T 428/31786* (2015.04); *Y10T 428/31938* (2015.04)

(58) Field of Classification Search
CPC ...... C04B 41/52; C08L 51/06; C08L 2666/04; C08L 2666/02; C09D 151/06; C09J 151/06; C08F 255/02; C08F 255/00; E04D 1/26; E04D 2001/005
See application file for complete search history.

(56) References Cited

U.S. PATENT DOCUMENTS

| | | | |
|---|---|---|---|
| 3,528,842 A | 9/1970 | Skadulis | |
| 3,752,696 A | 8/1973 | Beyard | |
| 4,352,837 A | 10/1982 | Kopenhaver | |
| 4,868,057 A | 9/1989 | Himes | |
| 5,248,364 A | 9/1993 | Liu | |
| 5,286,544 A | 2/1994 | Graham | |
| 5,380,552 A | 1/1995 | George | |
| 6,008,286 A | 12/1999 | Groves | |
| 6,426,309 B1 * | 7/2002 | Miller | ........... E04D 5/12 442/148 |
| 6,569,520 B1 | 5/2003 | Jacobs | |
| 6,583,202 B1 | 6/2003 | Grube et al. | |
| 6,881,701 B2 | 4/2005 | Jacobs | |
| 2002/0160151 A1 | 10/2002 | Pinault | |
| 2004/0014385 A1 | 1/2004 | Greaves et al. | |
| 2004/0172908 A1 | 9/2004 | Swann | |
| 2005/0142329 A1 | 6/2005 | Anderson et al. | |
| 2005/0191505 A1 | 9/2005 | Akarsu et al. | |
| 2005/0252137 A1 | 11/2005 | Bartek | |
| 2006/0196596 A1 | 9/2006 | Bartek | |
| 2007/0021825 A1 | 1/2007 | Wright et al. | |
| 2007/0117899 A1 | 5/2007 | Ouhadi | |
| 2009/0262520 A1 | 10/2009 | Park | |

FOREIGN PATENT DOCUMENTS

| | | |
|---|---|---|
| DE | 10305557 | 8/2004 |
| WO | WO 02/10244 | 2/2002 |

OTHER PUBLICATIONS

Cross Oil Refining & Marketing, Inc., Cross L—Series Safety Data Sheet, Jun. 13, 2013.*
Abu-Sharkl, B. F.; Kahraman, R.; Abbasi, S. H.; Hussein I.A., Journal of Applied Polymer Science, vol. 92, p. 2581, 2004.
Technical brochure "Epolyene Polymers".

* cited by examiner

*Primary Examiner* — Cheng Yuan Huang

(57) ABSTRACT

It is desired to find a new class of adhesion promoters to adhere the granules to the asphalt. Generally, the application is directed to an article comprising a substrate and a coating on the substrate, wherein the coating comprises a polyolefin. The substrate may be a roofing granule. In certain embodiments, the polyolefin is a chemically modified polyolefin. In some embodiments, the coating comprises a photocatalytic material.

18 Claims, No Drawings

ARTICLE COMPRISING AN ADHESION PROMOTOR COATING

CROSS REFERENCE TO RELATED APPLICATION

This application is a continuation of U.S. patent application Ser. No. 12/521,006, filed on Oct. 13, 2009, which is a National Stage filing under 35 U.S.C. of PCT/US07/87753, filed on Dec. 17, 2007, which claims the benefit of U.S. Provisional Patent Application No. 60/878,023, filed Dec. 29, 2006, the disclosure of which is incorporated by reference herein in their entirety.

FIELD

The present application is directed to coatings, especially coatings used as adhesion promoters.

BACKGROUND

Asphalt-based roofing systems and products are well known. They include, for example, asphalt shingles and asphalt roll roofing. Many conventional materials are utilized as raw materials in the manufacture of asphalt roofing systems and products.

Asphalt roofing systems and products generally comprise a fiberglass or organic matting, which is filled and/or coated with various asphalt materials. Generally, the matting is filled with a "saturant" asphalt. A saturant asphalt is oil-rich and relatively non-viscous, to provide maximum waterproofing and saturation of the matting. The saturant asphalt serves as a preservative, a waterproofing agent and an adhesive agent.

The saturated substrate is sealed by application of a harder, more viscous "coating" asphalt to one or both sides of the substrate. Coating asphalts generally contain finely divided minerals therein as stabilizers or fillers. Such compounds as igneous rock mineral fines, silica, slate dust, talc, micaceous materials, limestone and dolomite have been utilized as fillers to render the coating asphalt more shatterproof and shock-proof in cold weather.

The exterior, outer, or exposed surface of asphalt roofing systems and products is generally provided with a covering of granular material or roofing granules embedded in the coating asphalt. The granular material generally protects the underlying asphalt coating from damage due to exposure to light, in particular ultraviolet (UV) light. That is, the granules reflect light and protect the asphalt from deterioration by photodegradation. In addition, such granular material improves fire resistance and weathering characteristics. Further, colors or mixtures of colors of granular material may be selected for aesthetics.

In general, the mineral materials, particles or granules are embedded into the coating asphalt under pressure and are retained therein by adherence to the asphalt. With respect to each granule, the asphalt may be viewed as a "hot sticky mud" into which the granules are pressed. When the asphalt cools, pockets having the granules retained therein are formed.

Good adherence of the roofing granules to the roofing product is beneficial. Loss of granules reduces the life of the roof, since it is associated with acceleration of photodegradation of the asphalt. In addition, the aesthetics of the roofing system may be compromised if granules are lost. Further, reduction of granule loss during installation improves safety conditions on the roof.

The granule may be coated with a variety of materials, to render unique and desirable properties. For example, granules are generally treated with an adhesion promoter. Typically, the adhesion promoter has been silicone.

SUMMARY

It is desired to find a new class of adhesion promoters to adhere the granules to the asphalt. Generally, the application is directed to an article comprising a substrate and a coating on the substrate, wherein the coating comprises a polyolefin. The substrate may be a roofing granule. In certain embodiments, the polyolefin is a chemically modified polyolefin. In some embodiments, the roofing granule comprises a photocatalytic material.

The application is also directed to an article comprising a first coated substrate, comprising a first substrate and a coating comprising a polyolefin, and a second substrate, wherein the first coated substrate and the second substrate are attached and the coating on the first substrate is between the first substrate and the second substrate.

DETAILED DESCRIPTION

The present application is directed generally to adhesion promoter coatings for bonding a first substrate and a second substrate together. The adhesion promoter coating is generally between the two substrates. This adhesion promoter coating is especially useful in the manufacture of roofing materials, such as roofing shingles and roll roofing. For example, asphalt roofing materials may comprise at least a matting, asphalt, and granules. The granules comprise a first substrate, and the asphalt and matting comprise a second substrate.

A variety of materials may be utilized as the matting for the roofing materials. In general, the matting may comprise a non-woven matting of either fiberglass or cellulose fibers. Fiberglass matting may be used in the asphalt roofing products industry and is a typical matting for use with methods and in products according to the present application. Cellulose matting, sometimes referred to as organic matting or rag felt may also be utilized.

Fiberglass matting is commercially available from Owens-Corning Fiberglass Corporation, Toledo, Ohio and Manville Roofing Systems, Denver, Colo. These, and other commercially-available mattings, are utilized in embodiments of the present invention. It is recognized that any fiberglass mat with similar physical properties could be incorporated into the present application with satisfactory results. Generally, the fiberglass matting is manufactured from a silicate glass fiber blown in a non-woven pattern in streams of about 30-200 micrometers in diameter with the resultant mat approximately 1-5 millimeters in thickness.

Cellulose felt (dry felt) is typically made from various combinations of rag, wood and other cellulose fibers or cellulose-containing fibers blended in appropriate proportions to provide the desirable strength, absorption capacity and flexibility.

Roofing asphalt, sometimes termed "asphalt flux", is a petroleum based fluid comprising a mixture of bituminous materials. In the manufacture of roofing materials, it is generally desirable to soak the absorbent felt or fiberglass matting until it is impregnated or saturated to the greatest possible extent with a "saturant" asphalt, thus the asphalt should be appropriate for this purpose. Saturant asphalt is high in oily constituents which provide waterproofing and other preservatives. Matting saturated with saturant asphalt are generally sealed on both sides by application of a hard or more viscous "coating asphalt" which itself is protected by the covering of mineral granules. In the case of fiberglass mat based asphalt roofing products, it is well understood that the coating asphalt can be applied directly to the unsaturated fiberglass mat.

The asphalts used for saturant asphalt and the coating asphalt are generally prepared by processing the asphalt flux in such a way as to modify the temperature at which it will soften. In general, the softening point of saturant asphalt may vary from about 37° C. to about 72° C., whereas the softening point of desirable coating asphalt may run as high as about 127° C. The softening temperature varies among the roofing industry and may be modified for application to roof systems in varying climates.

In general, conventional, commercially available, asphalt systems may be utilized in applications of the present invention.

Roofing granules are generally applied to the surface of the asphalt on, for example, a roofing shingle. In general, they comprise colored slate or rock granules either in natural form or artificially colored by a ceramic coating.

In general, any mineral material which is opaque, dense, and properly graded by screening for maximum coverage can be used conventionally and in roofing products of the present invention. Generally, these materials are crushed and graded to a desired size. Any size granule or distribution of sizes may be useful in the roofing material industry may be used in the present application. Methods to color such granules are generally known in the art. See, for example, Beyard et al. in U.S. Pat. No. 3,752,696 which is incorporated herein by reference.

Suitable base granules can be selected from a wide class of relatively porous or non-porous and weather-resistant rock or mineral materials. Suitable minerals may include igneous rock, trap rocks, slates, argillite, greystone, greenstone, quartz, quartzite, certain granites or certain synthetic granules made from clay or other ceramics.

The granule may be coated with a variety of materials, to render unique and desirable properties. These coatings may be continuous or discontinuous. For example, it is desirable to have a coating which reduces dust and assists in the water repellency of the granule. Multiple coatings may be applied either sequentially or simultaneously.

In the present application the granules are generally coated with an adhesion promoter. In specific embodiments, the adhesion promoter comprises a polyolefin. For the purpose of the present application, a polyolefin is a polymer with an olefin backbone. Polymers include oligomers of low molecular weight. The polyolefins of the present application include a wide range of number average molecular weights, including, for example, as low as 300 to as high as 1,000,000. Olefins include ethylene, propylene, butene, and the like. These olefins can be aliphatic, aromatic, cyclic or other olefins. The polyolefin may be a homopolymer or a copolymer of olefins. In addition to one or more olefins, the polyolefin can optionally comprise one or more other monomer units, such as styrenes, acrylics, urethanes, and others known in the art. Such copolymers include random and block copolymers.

In certain embodiments, the polyolefin is chemically modified. For the purpose of the present application, a chemically modified polyolefin comprises a polyolefin which has been functionalized with a chemically reactive group. The chemically reactive group may be, for example, amines, epoxides, anhydrides, hydroxyls, thiols, isocyanates, acids (e.g. carboxylic and sulfonic), halides, esters, and the like.

In some embodiments, the chemically reactive group is a maleic anhydride. In specific embodiments, the chemically modified polyolefin is a maleic anhydride modified polypropylene. Examples of such chemically modified polyolefins include those sold under the tradename EPOLENE polymers, available from Eastman Chemical, Inc.; FUSABOND materials, available from E.I. Du Pont de Nemours Company; and OREVAC resins, available from Akema, Inc.

In some embodiments, the granules may be made photocatalytic. Photocatalysts are further described in U.S. Pat. Nos. 6,569,520; 6,881,701 and US patent application US2005/0142329 (Ser. No. 10/746,829), assigned to 3M Innovative Properties Company and incorporated by reference herein.

Upon activation or exposure to sunlight, photocatalysts are thought to establish both oxidation and reduction sites. These sites are thought to produce highly reactive species such as hydroxyl radicals that are capable of preventing or inhibiting the growth of algae or other biota on the coated article, especially in the presence of water. Many photocatalysts conventionally recognized by those skilled in the art are suitable for use with the present invention. Specific examples of photocatalysts include transition metal photocatalysts. Examples of suitable transition metal photocatalysts include $TiO_2$, $ZnO$, $WO_3$, $SnO_2$, $CaTiO_3$, $Fe_2O_3$, $MoO_3$, $Nb_2O_5$, $Ti_xZr_{(1-x)}O_2$, $SiC$, $SrTiO_3$, $CdS$, $GaP$, $InP$, $GaAs$, $BaTiO_3$, $KNbO_3$, $Ta_2O_5$, $Bi_2O_3$, $NiO$, $Cu_2O$, $SiO_2$, $MoS_2$, $InPb$, $RuO_2$, $CeO_2$, $Ti(OH)_4$, and combinations thereof. Particularly preferred photocatalysts include crystalline anatase $TiO_2$, crystalline rutile $TiO_2$, crystalline ZnO and combinations thereof.

To improve spectral efficiency, photocatalysts may be doped with a nonmetallic element, such as C, N, S, F, or with a metal or metal oxide, such as Pt, Pd, Au, Ag, Os, Rh, $RuO_2$, Nb, Cu, Sn, Ni, Fe, or combinations thereof.

In some embodiments, the granules may be made antimicrobial. Examples of such functionalized roofing granules can be found, for example in WO 02/10244, incorporated herein by reference. In some embodiments, the granule is made anti-microbial with the addition of Cuprous Oxide. See, e.g., U.S. Pat. No. 3,528,842, incorporated by reference herein.

In some embodiments, the roofing granules exhibit reflection of infared light. Examples of such functionalized roofing granules can be found, for example, at United States Patent Application Publication Number 2005/0142329, incorporated herein by reference. Generally, such granules provide a non-white construction surface having a reflectivity of at least about 20% at substantially all points in the wavelength range between 770 and 2500 nm.

A variety of additives, such as stabilizers and fillers, may be utilized in asphalt-based roofing systems. For example, additives may be added to the adhesion promoting coating on the granule, for example stabilizers, antioxidants, surfactants, and the like. In addition, igneous rock mineral fines, silica, slate dust, talc, micaceous materials, dolomite, limestone and trap rock may be utilized as stabilizers or fillers in the coating asphalt. These compounds are utilized in conventional systems and they may be used in improved systems (for example rubber modified asphalt) according to the present application in the same manner. Such materials render the asphalt base improved with respect to shatter resistance, shock resistance, and tensile strength. In addition, they provide fire protection. Also, they provide raw material cost savings and improved weathering characteristics. Additives may also include reflective particles, for example additives that reflect infrared light. Examples include those described in U.S. Patent Application Number 2007/021825, assigned to 3M Innovative Properties Company and incorporated by reference herein.

EXAMPLES

These examples are merely for illustrative purposes only and are not meant to be limiting on the scope of the appended claims. All parts, percentages, ratios, etc. in the examples and the rest of the specification are by weight, unless noted otherwise.

Materials Used in the Examples

Kiln fired, untreated roofing granules WA7100-Grey, available from 3M Company, Saint Paul, Minn.

Maleic anhydride modified polypropylene Epolene E43 (Mn=3900 g/mol, Mw=9100 g/mol, Acid Number: 45), available from Eastman Chemical Company, Kingsport, Tenn.

L-500 oil, available from Cross Oil Refining & Marketing, Inc., Smackover, Ark.

Sodium Silicate PD (37.0 wt % with 2.75 wt % ratio of $SiO_2/Na_2O$), available from PQ Corp., Valley Forge, Pa.

Tetraethyl ortho silicate, available from Aldrich (TEOS, 98%)

$TiO_2$ aqueous dispersion W2730X, available from Degussa AG as experimental material, Frankfurt, Germany.

Evaluation of Embedded Granule Adhesion to Asphalt Substrate

The dry rub test is a standard test method for the determination of granular adhesion to mineral-surfaced roofing under conditions of abrasion. The procedure is described in ASTM standard D4977 "Test Method for Granule Adhesion to Mineral Surfaced Roofing by Abrasion", incorporated herein by reference. Dry rub tests conducted to evaluate granular adhesion in products according to the present application, were conducted in compliance with this standard.

In general, a brush with 22 holes, each containing bristles made of 0.012 inch diameter tempered steel wire (40 wires per hole, set with epoxy) was used to abrade the granular surface of a specimen of mineral-surfaced roofing. The adhesion is assessed by weighing the amounts of granules that are displaced and become loose as a result of the abrasion test. The testing apparatus is a machine designed to cycle a test brush back and forth (horizontally) across a specimen at a rate of 50 cycles in a period of about 60-70 seconds while the brush assembly rests on the specimen with a downward mass of 5 pounds±¼ ounce with a stroke length of 6±¼ inch. The testing machine used is available commercially, as the 3M Granule Embedding Test Machine and Abrasion Test Brushes, 3M Company, St. Paul, Minn.

A minimum of two 2-inch by 9-inch specimens were utilized for each test, and any loose granules were removed from the specimen with gentle tapping. Each specimen was then weighed and the mass was recorded. The specimen was then clamped to the test machine and the brush was placed in contact with the specimen (with activation of the machine so that the specimen was abraded 50 complete cycles, the brush traveling parallel to the long axis of the specimen). The specimen was then removed and weighed; the loss in mass then being calculated.

In a typical test, nine scrub specimens were used for each rub condition to be tested. For example, nine for testing the specimen as received, and nine for a 7-day test in which the sample was soaked for seven days in deionized water prior to conducting the rub test.

The sample to be wet rub tested was placed in a soak tank with deionized water at a temperature of 70° F.±2° F. (21° C.±2° C.) for the specified period of time. When the soak period has ended, a sample to be tested is removed from the soak tank and gently blotted followed by weighing and recording the initial weight. The rub test is then conducted as outlined above, followed by recording the final weight. The initial weighing and rub test followed by final weighing was conducted in a timely manner to avoid water evaporation error.

Water Repellency Test

Water repellency test was performed by placing approximately 25.0 g of treated granules into a 20 ml test tube, which was then inverted onto a flat surface, thereby forming a loose cone-shaped granule aggregate pile. A 15 mm diameter indent was then created by pressing the bottom of the test tube onto the tip of cone-shaped granule aggregate pile. About 3 to 5 drops of DI water was placed into the indent, and time was recorded until the water disappeared.

Dust Measurement

Dust measurement of the treated granules was evaluated using a MetOne Particle Counter (Model 237B, available from Pacific Scientific Instruments, Wauconda, Ill.). The instrument was operated according to the manufacturers instructions. To perform the test, an ambient reading (dust reading of empty chamber) was first recorded. Then 50.0 g of full grade granules were poured into the funnel which was connected to the reading unit, and the recorder was simultaneously turned on. The test stopped after 35 seconds and the Total Count Reading at 0.3 microns was recorded (referred to as the dust reading). The actual sample dust reading was obtained by subtracting the ambient reading from the machine recorded dust reading. An average of three replicates was reported as net sample dust reading in the units of particles/ft$^3$.

Experimental

Preparation of Post-Treatment E43/Oil Solution

A 3.50% E43 oil solution was prepared by adding 100 g of L-500 oil and 3.50 g of Epolene E43 polymer to a 4 oz glass jar containing a magnetic stirring bar. The jar was then sealed and stirred in a 120° C. oil bath overnight, dissolving the E43 polymer to make the solution, and which can be applied when it is either cool or hot. A 5.00% E43 oil solution was prepared similarly, using 5.0 g of Epolene E43 in 100 g of L-500 oil.

Preparation of Treated Roofing Granules

Working example A: 1000 g of untreated, kiln fired WA7100 granules were heated in an oven at 360° F. (182° C.) for 1 hour and then poured into a gallon size stainless steel beaker affixed to a paint shaker. 2.587 g of the 3.5%

E43 oil solution was added dropwise during shaking (equivalent to a loading of 0.17 lb E43/Ton of granules and 5.0 lb oil/Ton of granules). The components were shaken for another 3 min after the completion of the addition of E43/oil solution. The treated granules were then placed in an oven at 176° F. (80° C.) for one hour, removed and allowed to cool.

Working example B: This example was prepared the same as working example A, but used 2.625 g of 5.0% E43 oil solution to treat 1000 g of untreated, kiln fired WA7100 granules (equivalent to a loading of 0.26 lb E43/Ton of granules and 5.0 lb oil/Ton of granules)

Roofing shingles were manufactured from each of the Working examples using the process similar to that outlined in U.S. Pat. No. 4,352,837, and these shingles were then cut as described above for testing. The results of this testing were tabulated in Table 1.

TABLE 1

Adhesion evaluation on asphalt roofing strips

| Samples | Post-treatment | Water repellency (min) | Net Dust Reading (particles/ 0.06 ft³) | Dry rub testing loss (g) | 7 day water soak Wet rub testing loss (g) |
|---|---|---|---|---|---|
| Comparative Example 1 | None | 0 | 514023 | 0.39 | 2.38 |
| Working Example A | E43 oil (0.17 lb/ton) | 35 | 5612 | 0.61 | 2.16 |
| Working Example B | E43 oil (0.26 lb/ton) | 5 | 1808 | 0.13 | 1.01 |

*Comparative Example 1 was prepared on a different day than Working Examples A and B.

Preparation of TiO2 Coated Roofing Granules WA7100

A 250 mL blender cup was charged with: TiO2 aqueous dispersion W2730X (1.67 g), deionized water (50.00 g), Sodium Silicate PD (0.60 g), and a freshly prepared mixture of tetraethyl ortho silicate (TEOS, 98% from Aldrich) in ethanol/water (10.00 g, mixture molar ratio: TEOS:EtOH: $H_2O$=1:40.7:53.6). The mixture was well mixed by swirling, and then slowly poured onto 1000 g of mechanically stirred, untreated, kiln fired WA 7100 granules, which had been heated in an oven at 200° F. (93° C.) for one hour prior to coating. After the completion of pouring, the granules were stirred for about 2 minutes while manually scraping the sides of the container with a metal spatula to ensure an even coating. The granules were then heated with a heat gun for about 4 minutes (granules appeared to be dry and loose) and then fired at 575° F. (302° C.), removed from the oven, and allowed to cool.

Working example C: this example was prepared exactly same way as working example A, but used 2.587 g of 3.5% E43 of oil solution to treat 1000 g of TiO2 coated WA7100 granules.

Working example D: this example was prepared exactly same way as working example A, but used 2.625 g of 5.0% E43 of oil solution to treat 1000 g of TiO2 coated WA7100 granules.

Roofing shingles were manufactured from each of the Working examples using the process similar to that outlined in U.S. Pat. No. 4,352,837, and these shingles were then cut as described above for testing. The results of this testing were tabulated in Table 2.

TABLE 2

Adhesion evaluations on actual asphalt roofing strips made from TiO2 coated WA7100

| Samples | Post-treatment | Water repellency (min) | Net Dust Reading particles/ 0.06 ft³ | Dry rub testing loss (g) | 7 day water soak wet rub testing loss (g) |
|---|---|---|---|---|---|
| Comparative Example 2 | None | 0 | 577856 | 0.60 | 6.15 |
| Working Example C | E43 oil (0.17 lb/ton) | 45 | 20666 | 0.16 | 1.58 |
| Working Example D | E43 oil (0.26 lb/ton) | 120 | 11000 | 0.15 | 1.18 |

* Comparative Example 2 was prepared on a different day than Working Examples A and B.

Various modifications and alterations of the present invention will become apparent to those skilled in the art without departing from the spirit and scope of the invention.

What is claimed is:

1. A coated roofing granule, comprising
   a porous or non-porous weather-resistant rock or mineral material, in natural form or optionally colored by a ceramic coating; and
   a continuous or discontinuous adhesion promoter coating comprising an oil and a chemically modified or functionalized polyolefin which is soluble in the oil.

2. The coated roofing granule of claim 1 wherein the chemically modified or functionalized polyolefin is modified with a chemically reactive group comprising amines, epoxides, anhydrides, hydroxyls, thiols, isocyanates, acids, halides, or esters.

3. The coated roofing granule of claim 1 wherein the continuous or discontinuous adhesion promoter coating comprises a mixture of polyolefins.

4. The coated roofing granule of claim 1 wherein the chemically modified or functionalized polyolefin is a chemically modified polyolefin and the chemically modified polyolefin is modified with maleic anhydride.

5. The coated roofing granule of claim 1 wherein the chemically modified or functionalized polyolefin is polypropylene.

6. The coated roofing granule of claim 1 wherein the coated roofing granule comprises a photocatalytic material.

7. The coated roofing granule of claim 6 wherein the photocatalytic material comprises $TiO_2$, ZnO, $WO_3$, $SnO_2$, $CaTiO_3$, $Fe_2O_3$, $MoO_3$, $Nb_2O_5$, $Ti_xZr_{(1-x)}O_2$, SiC, $SrTiO_3$, CdS, GaP, InP, GaAs, $BaTiO_3$, $KNbO_3$, $Ta_2O_5$, $Bi_2O_3$, NiO, $Cu_2O$, $SiO_2$, $MoS_2$, InPb, $RuO_2$, $CeO_2$, $Ti(OH)_4$, or combinations thereof.

8. The coated roofing granule of claim 6 wherein the photocatalytic material comprises crystalline anatase $TiO_2$, crystalline rutile $TiO_2$, crystalline ZnO or combinations thereof.

9. The coated roofing granule of claim 6 wherein the photocatalytic material is doped with a dopant.

10. The coated roofing granule of claim 9 wherein the dopant is C, N, S, F, Pt, Pd, Au, Ag, Os, Rh, $RuO_2$, Nb, Cu, Sn, Ni, Fe, or combinations thereof.

11. The coated roofing granule of claim 1 wherein the coated roofing granule has a reflectivity of at least about 20% at substantially all points in the wavelength range between 770 and 2500 nm.

12. An article comprising
a plurality of coating roofing granules as in claim 1; and
a substrate comprising an asphalt layer having a surface;
wherein the plurality of coated roofing granules have been applied to the surface of the asphalt and embedded in the asphalt so as to form pockets having the coated roofing granules retained therein; and
wherein the adhesion promoter coating improves the adhesion of the coated roofing granules to the asphalt.

13. The article of claim 12 wherein the plurality of coated roofing granules comprises a photocatalytic material.

14. The article of claim 13 wherein the photocatalytic material comprises $TiO_2$, $ZnO$, $WO_3$, $SnO_2$, $CaTiO_3$, $Fe_2O_3$, $MoO_3$, $Nb_2O_5$, $Ti_xZr_{(1-x)}O_2$, $SiC$, $SrTiO_3$, $CdS$, $GaP$, $InP$, $GaAs$, $BaTiO_3$, $KNbO_3$, $Ta_2O_5$, $Bi_2O_3$, $NiO$, $Cu_2O$, $SiO_2$, $MoS_2$, $InPb$, $RuO_2$, $CeO_2$, $Ti(OH)_4$, or combinations thereof.

15. The article of claim 13 wherein the photocatalytic material comprises crystalline anatase $TiO_2$, crystalline rutile $TiO_2$, crystalline ZnO or combinations thereof.

16. The article of claim 13 wherein the photocatalytic material is doped with a dopant.

17. The article of claim 16 wherein the dopant is C, N, S, F, Pt, Pd, Au, Ag, Os, Rh, $RuO_2$, Nb, Cu, Sn, Ni, Fe, or combinations thereof.

18. The article of claim 12 wherein the article has a reflectivity of at least about 20% at substantially all points in the wavelength range between 770 and 2500 nm.

* * * * *